US008834972B2

(12) United States Patent
Hasselmann

(10) Patent No.: US 8,834,972 B2
(45) Date of Patent: Sep. 16, 2014

(54) COATING SUBSTRATES FOR CATALYSTS IN BUNDLES

(75) Inventor: Wolfgang Hasselmann, Rheinfelden (DE)

(73) Assignee: Umicore AG & Co., KG, Hanau-Wolfgang (DE)

( * ) Notice: Subject to any disclaimer, the term of this patent is extended or adjusted under 35 U.S.C. 154(b) by 5 days.

(21) Appl. No.: 13/384,646

(22) PCT Filed: Jul. 22, 2010

(86) PCT No.: PCT/EP2010/004487
§ 371 (c)(1),
(2), (4) Date: Apr. 2, 2012

(87) PCT Pub. No.: WO2011/018156
PCT Pub. Date: Feb. 17, 2011

(65) Prior Publication Data
US 2012/0177822 A1    Jul. 12, 2012

(30) Foreign Application Priority Data

Aug. 13, 2009 (DE) .......................... 10 2009 037 381

(51) Int. Cl.
| | | |
|---|---|---|
| B01J 35/04 | (2006.01) | |
| B01J 37/02 | (2006.01) | |
| B05C 13/02 | (2006.01) | |
| B05D 7/22 | (2006.01) | |
| B01J 19/24 | (2006.01) | |

(52) U.S. Cl.
CPC ........... B01J 37/0211 (2013.01); B05C 13/025 (2013.01); B01J 35/04 (2013.01); F01N 2590/06 (2013.01); B05D 7/22 (2013.01); B01J 19/2485 (2013.01); Y10S 502/52719 (2013.01)
USPC ........... 427/408; 118/500; 427/230; 427/235; 427/239; 502/439; 502/527.19

(58) Field of Classification Search
None
See application file for complete search history.

(56) References Cited

U.S. PATENT DOCUMENTS

| | | | |
|---|---|---|---|
| 4,191,126 A | 3/1980 | Reed et al. | |
| 4,208,454 A | 6/1980 | Reed et al. | |
| 4,340,505 A | 7/1982 | Dolan | |
| 4,446,057 A * | 5/1984 | Lee et al. | ....... 502/355 |
| 5,165,970 A | 11/1992 | Schmidt et al. | |
| 5,182,140 A | 1/1993 | Watanabe et al. | |
| 7,094,728 B2 | 8/2006 | Yan et al. | |
| 7,323,054 B2 | 1/2008 | Aderhold et al. | |
| 7,465,690 B2 | 12/2008 | Yan | |
| 2001/0024686 A1 | 9/2001 | Kiessling et al. | |
| 2004/0025785 A1 | 2/2004 | Moore et al. | |
| 2008/0145531 A1 * | 6/2008 | Rosynsky et al. | ............. 427/231 |
| 2010/0093527 A1 | 4/2010 | Hasselmann | |

FOREIGN PATENT DOCUMENTS

| | | |
|---|---|---|
| DE | 2902073 | 8/1979 |
| DE | 4040150 | 8/1991 |
| DE | 10010642 | 9/2001 |
| DE | 10014547 | 10/2001 |
| DE | 102006027701 | 12/2007 |
| EP | 0157651 | 10/1985 |
| EP | 0792697 | 9/1997 |
| GB | 1515733 | 6/1978 |
| WO | WO 9748500 | 12/1997 |
| WO | WO 02/43850 A2 * | 6/2002 |
| WO | WO 0243850 | 6/2002 |
| WO | WO 03/011458 A1 * | 2/2003 |
| WO | WO 03011458 | 2/2003 |
| WO | WO 2008/113801 A1 * | 9/2008 |
| WO | WO 2008113801 | 9/2008 |

OTHER PUBLICATIONS

Kolb et al., "The Ins and Outs of Coating Monolithic Structures," Chemical Engineering Progress, vol. 89, No. 2, (Feb. 1989), pp. 61-68.
International Search Report, issued in PCT/EP2010/004487, dated Aug. 9, 2011.
International Preliminary Report on Patentability, issued in PCT/EP2010/004487, dated Feb. 23, 2012.

* cited by examiner

*Primary Examiner* — William Phillip Fletcher, III
(74) *Attorney, Agent, or Firm* — Brinks Gilson & Lione

(57) ABSTRACT

The invention relates to a process and an apparatus for coating a plurality of catalyst support bodies.

21 Claims, No Drawings

COATING SUBSTRATES FOR CATALYSTS IN BUNDLES

This application is a National Stage application of International Application No. PCT/EP2010/004487, filed Jul. 22, 2010, the entire contents of which is hereby incorporated herein by reference. This application also claims priority under 35 U.S.C. §119 to German Patent Application No. 10 2009 037 381.0, filed Aug. 13, 2009, the entire contents of which is hereby incorporated herein by reference.

In the coating of support bodies for catalysts, the cycle times are of great importance for inexpensive and efficient manufacture.

In processes known hitherto, cycle times are shortened by, for example, supply of coating suspension and subsequent removal of excess coating suspension by means of high flow velocities of the gases and liquids used.

This is described in GB 1 515 733, U.S. Pat. No. 4,208,454, EP 0 157 651, DE 40 40 150 and U.S. Pat. No. 5,182,140.

This procedure is subject to natural limits which stand in the way of a further increase in the cycle times.

In addition, there is an increasing need for numerous different sizes of coated support bodies, for which conventional processes require new machines.

It is an object of the present invention to provide a new process and a new apparatus by means of which a further increase in the cycle times, based on individual support bodies, and flexible use of existent plants is made possible.

This object is achieved by a process for the complete or partial coating of cylindrical support bodies with coating suspension, where the support bodies each have a cylinder axis, two end faces, a cylindrical surface and an axial length L and have a plurality of channels running from the first end face to the second end face and the support body is coated with the desired amount of the coating suspension by aligning its cylinder axis vertically and introducing the coating suspension into the channels via at least one of the end faces of the support bodies, characterized in that a plurality of support bodies are simultaneously arranged in a coating apparatus, the coating suspension is simultaneously introduced into the channels of the support bodies and the support bodies are subsequently removed simultaneously from the coating apparatus.

After the simultaneous introduction of the coating suspension into the channels of the support bodies, excess coating suspension is removed again simultaneously from the channels of the support bodies.

The simultaneous arrangement of a plurality of support bodies on the coating apparatus allows increased productivity even when, due to the process-relevant parameters of the coating, e.g. type and nature of the coating, viscosity of the coating suspension and diameter of the channels, a further reduction in the actual coating time cannot be achieved, since in this way a plurality of support bodies are coated during the required coating time and the cycle time per individual coated support body is thus reduced. This procedure is of particular interest for the coating of small-volume support bodies, e.g. for use in exhaust gas catalysts for motor cycles, lawnmowers and the like, which can be produced economically feasibly by the process of the invention on plants for producing automobile catalysts.

According to the invention, a plurality of support bodies, i.e. at least two, particularly advantageously from three to 30, in particular from 5 to 25, very particularly preferably from 7 to 21, support bodies, are arranged simultaneously on a coating apparatus.

According to the invention, the support bodies to be coated are filled from at least one of the end faces with a fill volume of the coating suspension, where the fill volume is such that the support body is filled to a height which amounts to a predetermined fraction of its length L and excess coating suspension is removed and the desired amount of coating thus remains on the support bodies.

The fraction of the length L can also be L itself, so that the support bodies are in this case coated over the entire length.

The coating of the support bodies can be carried out in any suitable way. In an embodiment of the invention, the support bodies can be filled with the coating suspension from the lower end face. Here, it is usually advantageous for excess coating suspension also to be removed in a downward direction.

For example, the support bodies can for this purpose be arranged on a coating apparatus and supplied with the desired fill volume of the coating suspension from the lower end face in a direction opposite to that of gravity and, after interruption of the supply of coating suspension, the excess coating suspension can be removed by application of a pressure gradient.

In a specific embodiment of the invention, the coating suspension can be placed in a vessel at the lower end of the coating apparatus, with this vessel being matched to the shape of the end faces of the support bodies or a carrier for these support bodies, and the coating suspension can be sucked through the lower end faces of the support bodies into the channels of the support bodies by application of a reduced pressure at the upper end faces of the support bodies. Such a process is described, for example, in U.S. Pat. No. 4,340,505 and U.S. Pat. No. 7,323,054.

In a further specific embodiment of the invention, the coating suspension can, as an alternative, be introduced into the channels of the support bodies by the coating suspension being placed under pressure and being pushed through the lower end faces of the support bodies into the channels.

In a further variant, the support bodies can be coated by being supplied from above with coating suspension. For this purpose, the coating suspension is poured over the support bodies from above, i.e. the upper end face of the support bodies, and a subatmospheric pressure is simultaneously or subsequently applied to the lower end face of the support bodies in order to suck in the coating suspension. In an advantageous embodiment of this variant, a protective envelope is wrapped around the support bodies or the support bodies are provided at the top with a vessel matched to the shape of the end faces of the support bodies so that the coating suspension does not come into contact with the outer cylindrical surfaces of the support bodies. In a further advantageous embodiment, the viscosity of the coating suspension is set (for example by means of additives such as thixotropes or by setting of the concentration of the constituents or amount of solvent used) in such a way that the coating suspension enters the channels only when the subatmospheric pressure is applied to the lower end face of the support bodies. Here, the subatmospheric pressure can be applied either simultaneously with the pouring-over of the coating suspension or else subsequently, i.e. the coating suspension is applied to the upper end faces of the support bodies and a subatmospheric pressure is subsequently applied to the lower end faces of the support bodies. A suitable procedure of this type is described in principle in WO 97/48500.

After charging of the support bodies with the coating suspension, the excess coating suspension is, after the supply of coating suspension to the support bodies has been interrupted, removed by application of a pressure gradient.

For this purpose, it is possible, for example, to apply a vacuum to the lower end faces by, for example, opening a valve to an evacuated vessel at subatmospheric pressure. At the same time, air or another gas which is inert toward the coated support body and the coating suspension, e.g. nitrogen, can be supplied at atmospheric pressure to the upper end faces of the support body. Since the pressure in the vacuum vessel decreases, the flow rate of the gas into the channels of the support body also decreases. However, it is also possible to employ the reverse procedure and apply the vacuum to the upper end faces and supply the gas to the lower end faces of the support bodies. Likewise, this supply can also be changed or reversed one or more times, which according to U.S. Pat. No. 7,094,728 brings about more uniform coating of the channels in the support bodies.

Instead of application of a reduced pressure ("sucking-out" of the support bodies), it is also possible to apply a superatmospheric pressure ("blowing-out" of the support bodies). For this purpose, air or another gas which is inert toward the coated support bodies and the coating suspension, e.g. nitrogen, is supplied under superatmospheric pressure to the upper or lower end faces. Those end faces opposite the end faces to which gas pressure is applied have to ensure sufficient outflow of the gas. For this purpose, it is possible to apply a subatmospheric pressure (vacuum), but this is not absolutely necessary. However, a gas or liquid pressure should not simultaneously be applied to the opposite ends, so as to ensure a flow rate of the gas which is sufficient to remove excess coating suspension from the channels of the support bodies. In this case, the superatmospheric pressure can, in a manner similar to the method briefly outlined in U.S. Pat. No. 7,094, 728, be applied alternately to the upper and lower end faces.

After removal of the excess coating suspension, the support bodies are dried and subsequently subjected to a heat treatment (calcined).

If necessary, the support bodies can also be coated a number of times with the coating suspension. This can in principle occur before or after drying, or else after the heat treatment, but this is less preferred. In further coating steps, the coating suspension can have the same composition or a different composition as/than the coating suspension applied first.

The coating suspension can be not only, as suggested by the name, a suspension but also a dispersion or solution. This can contain noble metal or a noble metal solution. Suitable coating suspensions are described, for example, in U.S. Pat. No. 7,465,690, column 2, line 63 to column 4, line 45, which is incorporated by reference.

The support bodies can advantageously be, in a step preceding the above process steps, collected into bundles, i.e. the invention also provides a process for the complete or partial coating of cylindrical support bodies with coating suspension, where the support bodies each have a cylinder axis, two end faces, a cylindrical surface and an axial length L and have a plurality of channels running from the first end face to the second end face and the support body is coated with the desired amount of the coating suspension by aligning its cylinder axis vertically and introducing the coating suspension into the channels via at least one of the end faces of the support bodies, which comprises the steps:

provision of a plurality of support bodies;
collection of the support bodies to form a bundle of support bodies;
arrangement of the bundles of support bodies on a coating apparatus;
simultaneous introduction of the coating suspension into the channels of the support bodies and removal of the support bodies from the coating apparatus.

The bundles comprise a plurality of support bodies, particularly advantageously from 7 to 21 support bodies.

After the simultaneous introduction of the coating suspension into the channels of the support bodies, excess coating suspension is removed again simultaneously from the channels of the support bodies.

The support bodies collected into bundles can advantageously be joined to one another in order to aid transport and reduce disruption to the process by support bodies falling over, since the bundles of support bodies joined together have, due to their lower center of gravity, better stability than the individual support bodies. This can be brought about in any way, for example by means of adhesive tape, string, plastic connectors (for example cable binders), metal tape or metal wire. If a metal wire or metal tape is used for joining, this cannot be removed by burning out in the heat treatment carried out in the course of the process. This is a disadvantage because the support bodies are finally installed or packed individually and a separate step for removal of the metal is then required. However, if packing or installation of the support bodies in the bundle is intended, adjoining the support bodies by means of metal wire or metal tape is advantageous.

In a further embodiment of the invention, support bodies can be adhesively bonded to one another, which is particularly advantageous when the finished, coated support bodies are to be individually packed or installed. In this case, the support bodies can be joined in the desired arrangement by means of an adhesive which burns out during a subsequent heat treatment (e.g. during calcination), for example an adhesive based on polyvinyl alcohol or polyvinyl acetate or a hot melt adhesive. After drying or setting or cooling of the adhesive, the resulting bundle of support bodies joined to one another is processed further.

The joining of the support bodies of a bundle is advantageously not effected in the middle of the support bodies, based on the length L of the support bodies. In the case of an arrangement of, for example, a metal wire in the middle, it would be observed that individual support bodies slip out of the bundles relatively often. Depending on the external shape of the support bodies, these are bundled in their closest packing. These bundles comprise at least two, particularly advantageously from three to 30, in particular from 5 to 25, very particularly preferably from 7 to 21, support bodies. In the case of a round, circular cross section, preference is given to 7 or 21 support bodies being collected into a bundle.

The support bodies are arranged on a coating apparatus in such a way that one of the end faces of each support body is arranged on a perforated plate whose arrangement of holes, hole size and number of holes corresponds to the arrangement, size and number of the support bodies. If, for example, seven support bodies having a circular cross section are collected to form a bundle having a central support body surrounded by six further support bodies in the form of a hexagon, the perforated plate has to have six circular openings, with a central opening being surrounded by six further openings in the form of a hexagon. The support bodies naturally must each stand on the openings and the openings must be sufficiently large for coating of essentially all channels. The openings therefore must not be so small that only a fraction of the channels are accessible for the coating suspension. The perforated plate consists of a suitable material, for example a metal or plastic. At least one sealing material is advantageously arranged between the perforated plate and the end faces of the support bodies. Suitable sealing materials are, for example, rubber or thermoplastic elastomers which are arranged either as sealing rings on the perforated plate or as a mat which is provided with the same pattern of holes as the perforated plate and rests on or is fixed to this. In this case, the support bodies are held in place by pressure onto the sealing material and the perforated plate for carrying out the process of the invention. For this purpose, it is possible, for example, to provide a second perforated plate which can be provided with a second sealing material and can be placed on the upper end faces of the support bodies. The support bodies are arranged on a first perforated plate which is advantageously provided with a first sealing material. First and second sealing material are identical or different and can be arranged on or fastened to the respective perforated plate in the same way or a different way. The second perforated plate can then be loaded with such a force that the support bodies are pressed onto the first perforated plate and the first sealing material which is advantageously present.

Uniform coating of the support bodies can be ensured by means of flow equalizers.

The perforated plate generally has a size which corresponds essentially to the size of the opening in the coating apparatus through which the coating suspension is introduced into the channels of the support bodies.

However, in a further embodiment of the invention, the perforated plate is larger than the opening in the coating apparatus, in which case the support bodies cannot all be arranged simultaneously directly over the opening of the coating apparatus. In this way, a larger number of the support bodies can then be coated simultaneously or an equal or smaller number of larger support bodies can be coated simultaneously. However, the perforated plate is then a more complex component which introduces the coating suspension into the support bodies through suitably arranged channels. These channels can either be arranged within the perforated plate by, for example, the perforated plate connecting the opening of the coating apparatus to the holes in the perforated plate on which the support bodies are arranged by means of channels running in the material. As an alternative, these channels can also be present outside the perforated plate. In this case, the opening of the coating apparatus is connected to the holes in the perforated plate on which the support bodies are arranged via hoses or pipes arranged on the outside of the perforated plate. This then makes it possible to coat a larger number of the support bodies simultaneously, or an equal or smaller number of larger support bodies can be coated simultaneously.

In a further embodiment of the invention, a plurality of support bodies are collected to form a bundle and joined to one another by means of a perforated plate. These support bodies joined to one another by means of a perforated plate can be transported simultaneously and coated together.

The plurality of support bodies after simultaneous coating are advantageously likewise subjected simultaneously to further process steps, advantageously at least one drying step and/or a heat treatment. Here, these support bodies can be collected into bundles and, as described above, advantageously be joined by means of a metal wire, metal tape or a perforated plate.

The support bodies are generally made of a suitable ceramic or metallic material. The ceramic material of the support bodies can consist of cordierite, mullite, aluminum titanate, silicon carbide or other ceramic materials. Owing to its high temperature resistance and its low thermal expansion, silicon carbide or a metallic material is preferably used. A suitable metallic material is, for example, steel, in particular stainless steel.

The process of the invention is particularly suitable for coating small support bodies, for example for gasoline-driven garden or forestry appliances, motor cycles or mopeds, on conventional production plants for automobile catalysts. Here, the support bodies often have volumes of 200 ml or less and/or a maximum diameter of 70 mm, preferably 50 mm.

The invention also provides an apparatus for carrying out the process, where the coating apparatus has at least one perforated plate or opening whose arrangement of holes, hole size and number of holes corresponds to the arrangement, size and number of support bodies at the place provided for introduction of the coating suspension. According to the invention, a plurality of support bodies are coated simultaneously so that the perforated plate or coating apparatus advantageously has at least one, in particular at least two, particularly advantageously from three to 30, in particular from 5 to 25, very particularly preferably from 7 to 21, openings. In principle, it is also possible to have a larger number of openings and thus be able to coat numerous support bodies by simultaneous coating, but the force by means of which the bundle of support bodies is held together mechanically has to be increased greatly in order to prevent the middle support body from slipping out. Here, the process of the invention has its natural limit when the force required for reliably connecting the support bodies exceeds their mechanical stability.

The apparatus advantageously has a sealing material on at least the side facing the end faces of the support bodies. The nature of the perforated plate and the sealing material or sealing materials has been described above.

The invention claimed is:

1. A process for the complete or partial coating of a plurality of cylindrical support bodies with coating suspension, the process comprising simultaneously arranging the plurality of cylindrical support bodies in a coating apparatus, wherein each support body includes a cylinder axis, a lower end face and an upper end face, a cylindrical surface, an axial length L and a plurality of channels running from the lower end face to the upper end face, and wherein arranging comprises aligning the cylinder axis of each support body vertically on the coating apparatus;

simultaneously introducing the coating suspension into the channels of the support bodies via the end faces of the support bodies whereby the support bodies are coated with the desired amount of coating suspension; and simultaneously removing the coated support bodies from the coating apparatus, wherein each support body is arranged on the coating apparatus with at least one end face on a perforated plate, wherein the perforated plate comprises an arrangement of holes, hole sizes and number of holes corresponding to the arrangement, size and number of support bodies, and wherein each support body is disposed in a corresponding hole of the perforated plate.

2. The process of claim 1, further comprising filling each of the support bodies from its end face to a height which amounts to a predetermined fraction of the length L of the support body and removing excess coating suspension whereby the desired amount of coating remains on the support body.

3. The process of claim 2, wherein excess coating suspension is removed in a downward direction.

4. The process of claim 1, wherein the support bodies are filled with the coating suspension from their lower end faces.

5. The process of claim 1, wherein the support bodies are coated by pouring the coating suspension over the upper end faces of the support bodies and by applying a subatmospheric pressure to the lower end faces of the support bodies in order to suck in the coating suspension.

6. The process of claim 1, further comprising collecting the plurality of support bodies into a bundle in a preceding step.

7. The process of claim 6, wherein the plurality of support bodies are mechanically joined to one another in the bundle.

8. The process of claim 7, wherein the support bodies are not joined in the middle relative to their length L.

9. The process of claim 7, wherein the support bodies are mechanically joined to one another in the bundle by a metal wire, a metal tape or a perforated plate.

10. The process of claim 6, wherein the bundle contains 7 to 21 support bodies.

11. The process of claim 1, wherein a sealing material is arranged between the perforated plate and the end faces of the support bodies.

12. The process of claim 11, wherein the support bodies are held in place by pressure onto the sealing material and the perforated plate.

13. The process of claim 1, further comprising simultaneously subjecting the plurality of support bodies to further processing after coating.

14. The process of claim 13, wherein the further processing is drying.

15. The process of claim 13, wherein the further processing is heat treatment.

16. The process of claim 1, wherein the plurality of support bodies are constructed of metallic material.

17. The process of claim 1, wherein the support bodies have a volume of 200 ml or less and/or a maximum diameter of 70 mm.

18. The process of claim 1, wherein the support bodies have a volume of 200 ml or less and/or a maximum diameter of 50 mm.

19. A coating apparatus for carrying out the process of claim 1, comprising a perforated plate having an arrangement of holes, hole sizes and number of holes corresponding to the arrangement, size and number of support bodies introduced to the coating apparatus, wherein when the support bodies are arranged on the coating apparatus, each support body is disposed in a corresponding hole of the perforated plate.

20. The apparatus of claim 19, wherein the perforated plate has a sealing material on at least a side facing the end faces of the support bodies.

21. The apparatus of claim 19, wherein the support bodies have a volume of 200 ml or less and/or a maximum diameter of 70 mm.

* * * * *